US012698103B2

(12) United States Patent
Fisher-Stawinski et al.

(10) Patent No.: US 12,698,103 B2
(45) Date of Patent: Aug. 4, 2026

(54) HARNESSING WASTE HEAT OF SPACECRAFT TO TRANSMIT DATA

(71) Applicant: International Business Machines Corporation, Armonk, NY (US)

(72) Inventors: Steven Lee Fisher-Stawinski, Buffalo Grove, IL (US); Naeem Altaf, Round Rock, TX (US); John Stern Alexander, Hampstead, NC (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

(21) Appl. No.: 19/020,867

(22) Filed: Jan. 14, 2025

(65) Prior Publication Data

US 2026/0200604 A1    Jul. 16, 2026

(51) Int. Cl.
B64G 1/42          (2006.01)

(52) U.S. Cl.
CPC .................................... B64G 1/428 (2013.01)

(58) Field of Classification Search
CPC ...... B64G 1/427; B64G 1/428; B64G 1/1007; B64G 99/00
See application file for complete search history.

(56) References Cited

U.S. PATENT DOCUMENTS

| | | |
|---|---|---|
| 4,161,212 A | 7/1979 | Hightower |
| 4,594,507 A | 6/1986 | Elliott et al. |
| 5,040,859 A | 8/1991 | White |
| 5,159,480 A | 10/1992 | Gordon et al. |
| 5,680,135 A | 10/1997 | Bushman |

(Continued)

FOREIGN PATENT DOCUMENTS

| | | |
|---|---|---|
| CN | 102519600 B | 12/2014 |
| CN | 208429250 U | 1/2019 |

(Continued)

OTHER PUBLICATIONS

Diederik Willemsen, "Lights and buoys Aids to navigation", https://sailingissues.com/navcourse9.html, Jan. 14, 2025, 27 pages.

(Continued)

*Primary Examiner* — Christopher P Ellis
(74) *Attorney, Agent, or Firm* — Steven M. Bouknight

(57)          ABSTRACT

Described are techniques for harnessing the waste heat of a spacecraft to transmit data. A heat sink is thermally connected to the spacecraft. A heat sink refers to a component used to dissipate heat generated by components, such as electronics of a spacecraft, allowing the heat sink to radiate heat into a space vacuum environment. Furthermore, the system includes a modulation mechanism of the spacecraft connected to the heat sink, where the modulation mechanism selectively alters the waste heat thermal radiation emitted from the heat sink according to a signal. The emission of the waste heat thermal radiation from the heat sink at a particular frequency or pattern of pulses is used to encode data. In this manner, data can be transmitted in space in an energy efficient manner by harnessing the waste heat of the spacecraft to transmit data, which otherwise would be lost.

20 Claims, 9 Drawing Sheets

(56)                References Cited

U.S. PATENT DOCUMENTS

| | | | |
|---|---|---|---|
| 6,939,392 B2 | 9/2005 | Huang et al. | |
| 6,954,591 B2 | 10/2005 | Lupton et al. | |
| 10,538,346 B2 | 1/2020 | Ground et al. | |
| 12,009,867 B1 * | 6/2024 | Chaffee | H04B 10/07953 |
| 12,250,021 B1 * | 3/2025 | Chaffee | H04B 10/0775 |
| 2019/0044470 A1 * | 2/2019 | Schubert | H02S 20/30 |
| 2020/0139631 A1 * | 5/2020 | Buller | G05B 19/4099 |
| 2020/0277087 A1 * | 9/2020 | Kaen | B64G 1/242 |
| 2022/0073217 A1 | 3/2022 | Iverson et al. | |
| 2024/0308695 A1 | 9/2024 | Homma et al. | |
| 2025/0141558 A1 * | 5/2025 | Welch | H04B 10/27 |

FOREIGN PATENT DOCUMENTS

| | | |
|---|---|---|
| EP | 0465330 A1 | 1/1992 |
| EP | 0822139 A1 | 2/1998 |
| EP | 2956365 A1 | 12/2015 |
| GB | 189611496 A | 5/1897 |
| JP | H11-217100 A | 8/1999 |
| JP | 2973996 B2 | 11/1999 |
| WO | 91/07028 A1 | 5/1991 |

OTHER PUBLICATIONS

Eduard Kovacs, "LF Electromagnetic Radiation Used for Stealthy Data Theft From Air-Gapped Systems", Securityweek Network, Dec. 9, 2022, 4 pages.

Kim Zetter, "Stealing Data From Computers Using Heat", Wired, Mar. 23, 2015, 5 pages.

International Searching Authority, "Notification of Transmittal of the International Search Report and the Written Opinion of the International Searching Authority, or Declaration," Patent Cooperation Treaty, Feb. 18, 2026, 16 pages, International Application No. PCT/EP2025/086824.

* cited by examiner

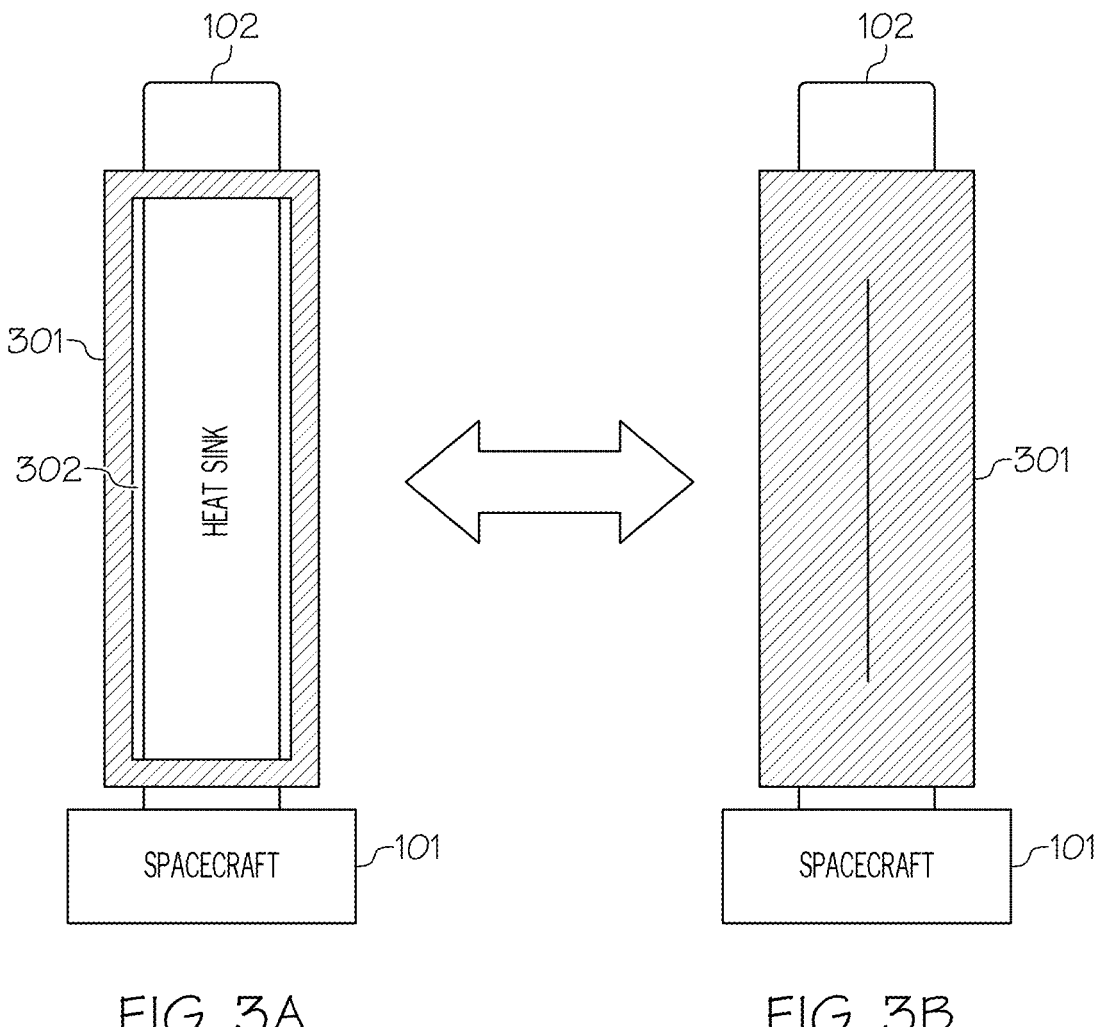
FIG. 3A                  FIG. 3B

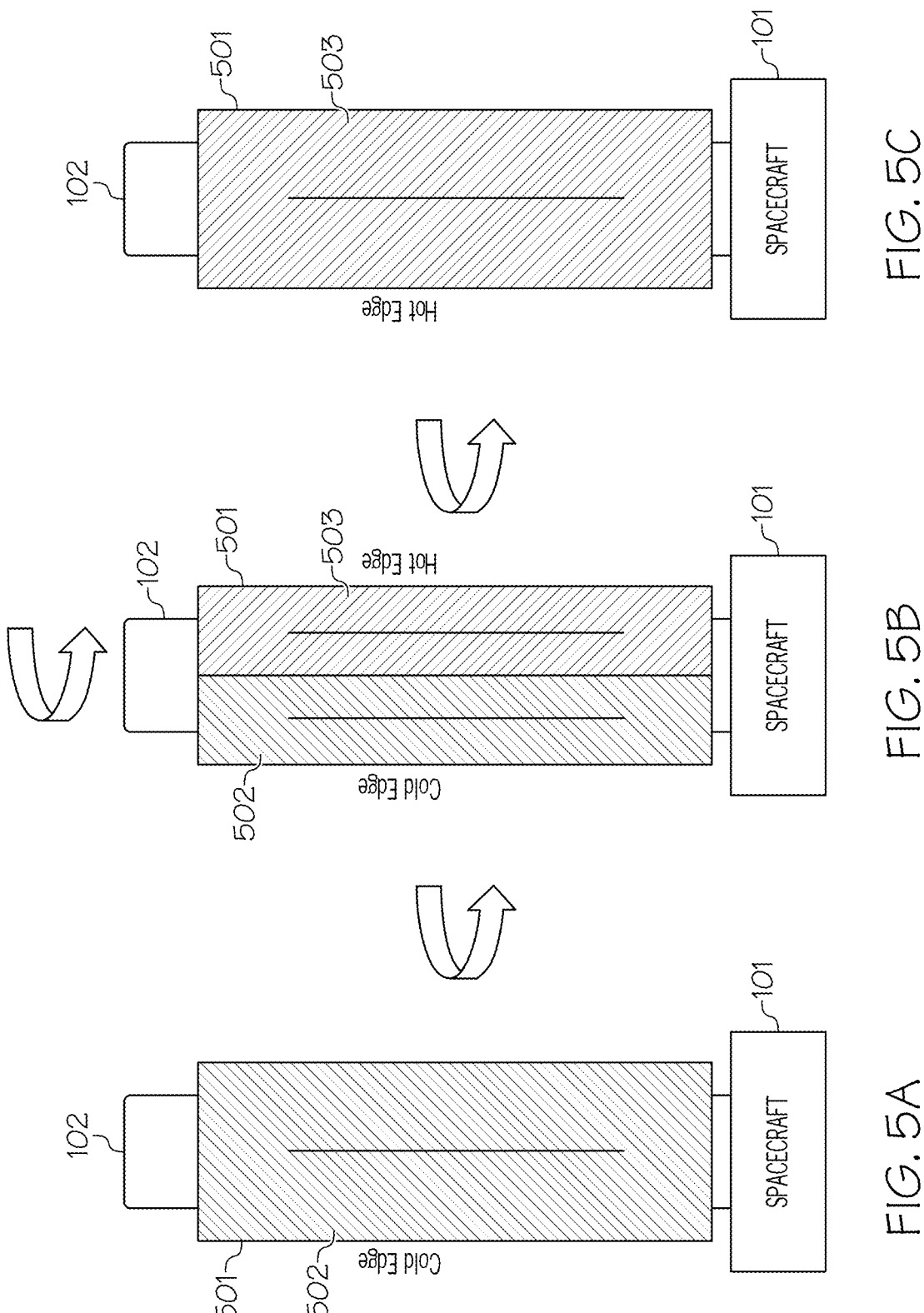

HARNESSING WASTE HEAT OF SPACECRAFT TO TRANSMIT DATA

TECHNICAL FIELD

The present disclosure relates generally to data transmission in space.

BACKGROUND

Data transmission in space refers to the process of sending and receiving information between spacecrafts, satellites, and probes in space. Furthermore, such space data transmission may involve sending and receiving information between spacecrafts, satellites, or probes in space and a ground station on Earth. Such data transmissions may involve using radio waves transmitted through antennas to carry data across vast distances allowing recipients to receive information, such as images, measurements, and status updates from space missions.

Currently, in order to encode data onto radio waves, a process called modulation is used, where the wave properties are altered to represent the information. By using modulation, data is encoded in the radio waves using electromagnetic energy, which is energy intensive.

Furthermore, spacecrafts generate waste heat (excess heat generated by the spacecraft's operational components) which needs to be dissipated into space. Unfortunately, the vacuum of space is a heat insulator, which provides no material medium to carry the waste heat away from the spacecraft, such as via conduction or convection. As a result, the spacecraft's waste heat can only leave the spacecraft by radiation, usually as electromagnetic waves in the infrared band. Current solutions for removing waste heat generally involve radiative structures affixed to the spacecraft where waste heat preferentially accumulates, either by passive conduction or by active circulation of a heat transfer fluid.

Unfortunately, existing means for transmitting data in space necessarily consume the spacecraft's available power, rendering that power not available for other uses. The state of the art would be advanced by the disclosure of techniques to achieve data transmission at low power and by techniques that re-use waste heat.

SUMMARY

In one embodiment of the present disclosure, a system for harnessing waste heat of a spacecraft situated in a space vacuum environment to transmit data comprises a heat sink thermally connected to the spacecraft, where the heat sink is configured to absorb and dissipate waste heat of the spacecraft into the space vacuum environment. The system further comprises a modulation mechanism of the spacecraft connected to the heat sink, where the modulation mechanism is configured to selectively alter a waste heat thermal radiation emitted from the heat sink according to a signal, and where data based on the signal is detectable in the waste heat thermal radiation.

Furthermore, in one embodiment of the present disclosure, a method for harnessing waste heat of a spacecraft to transmit data comprises selectively altering waste heat thermal radiation emitted from a heat sink connected to the spacecraft according to a signal, where the waste heat thermal radiation is emitted from the heat sink according to a modulation selected from the group consisting of: a frequency of pulses, a pattern of pulses, a spatial configuration of thermal signals, and a thermal gradient, and where the emission of the waste heat thermal radiation encodes the data.

Additionally, in one embodiment of the present disclosure, a system comprises an infrared optical receiver configured to detect a waste heat thermal radiation emitted from a heat sink of a spacecraft, where the waste heat thermal radiation encodes data via modulation selected from the group consisting of: a frequency of pulses, a pattern of pulses, a spatial configuration of thermal signals, and a thermal gradient, and where the infrared optical receiver is further configured to detect an infrared optical signal from the detected waste heat thermal radiation. The system further comprises a signal detection module being in electronic communication with the infrared optical receiver, where the signal detection module is configured to extract a data signal from the infrared optical signal based on the modulation.

Accordingly, embodiments of the present disclosure transmit data in space in an energy efficient manner by harnessing the waste heat of the spacecraft to transmit data, which otherwise would be lost.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIGS. 3A-3B illustrate selectively altering the waste heat thermal radiation emitted from the heat sink according to a signal by a rotating sleeve in accordance with an embodiment of the present disclosure;

FIGS. 5A-5C illustrate selectively altering the waste heat thermal radiation emitted from the heat sink according to a signal by a rotating thermal gradient in accordance with an embodiment of the present disclosure;

DETAILED DESCRIPTION

Figure 1:
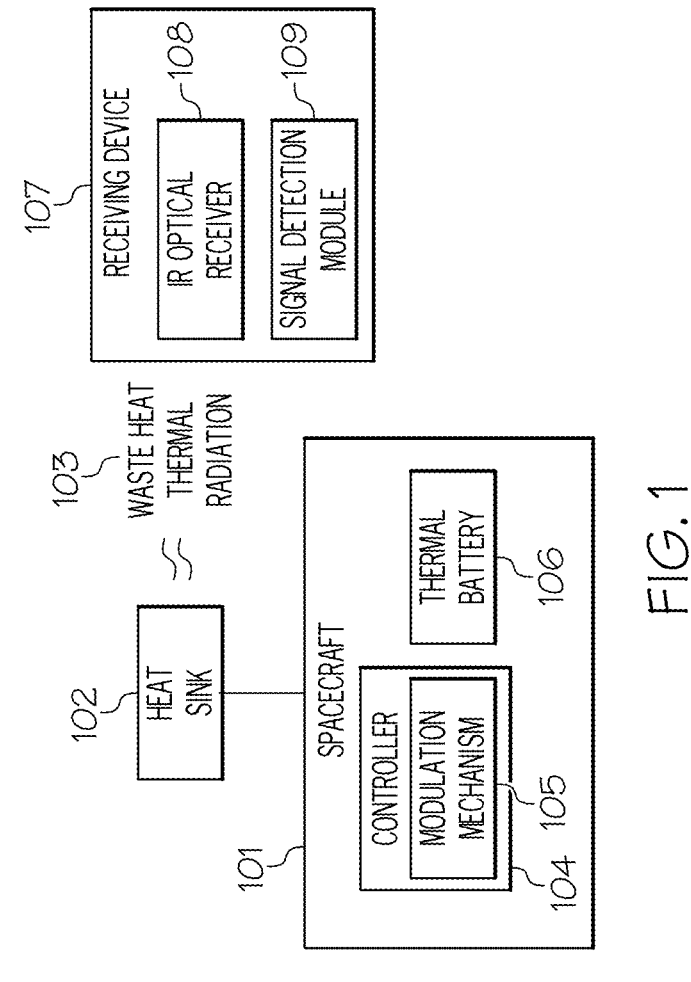
FIG. 1 illustrates an embodiment of the present disclosure of a communication system for practicing the principles of the present disclosure.

In one embodiment of the present disclosure, a system for harnessing waste heat of a spacecraft situated in a space vacuum environment to transmit data comprises a heat sink thermally connected to the spacecraft, where the heat sink is configured to absorb and dissipate waste heat of the spacecraft into the space vacuum environment. The system further comprises a modulation mechanism of the spacecraft connected to the heat sink, where the modulation mechanism is configured to selectively alter a waste heat thermal radiation emitted from the heat sink according to a signal, and where data based on the signal is detectable in the waste heat thermal radiation.

In this manner, data can be transmitted in space in an energy efficient manner by harnessing the waste heat of the spacecraft to transmit data, which otherwise would be lost.

Additionally, in one embodiment of the present disclosure, the heat sink is connected to a plurality of thermally radiating elements that are selectively thermally connected and unconnected to the heat sink according to the signal.

In this manner, data can be encoded using the waste heat of the spacecraft, such as by emitting waste heat thermal radiation in a pattern of pulses or at a frequency based on the signal generated by the modulation mechanism.

Furthermore, in one embodiment of the present disclosure, the thermally radiating elements are spatially distributed such that the selective thermal connection and disconnection encodes the data in a spatial relationship between the thermally radiating elements.

In this manner, data can be encoded using the waste heat of the spacecraft, such as by emitting waste heat thermal radiation in a pattern of pulses or at a frequency based on the signal generated by the modulation mechanism.

Additionally, in one embodiment of the present disclosure, the heat sink comprises a cylindrical thermally radiating element surrounded by an insulating sleeve.

In this manner, data can be encoded using the waste heat of the spacecraft, such as by emitting waste heat thermal radiation in a pattern of pulses or at a frequency based on the signal generated by the modulation mechanism.

Furthermore, in one embodiment of the present disclosure, the insulating sleeve comprises at least one hole.

In this manner, data can be encoded using the waste heat of the spacecraft, such as by emitting waste heat thermal radiation in a pattern of pulses or at a frequency based on the signal generated by the modulation mechanism.

Additionally, in one embodiment of the present disclosure, the insulating sleeve is configured to rotate thereby emitting thermal radiation in a pattern of pulses via the at least one hole based on the signal.

In this manner, data can be encoded using the waste heat of the spacecraft, such as by emitting waste heat thermal radiation in a pattern of pulses or at a frequency based on the signal generated by the modulation mechanism.

Furthermore, in one embodiment of the present disclosure, the insulating sleeve is configured to rotate at a particular frequency based on the signal, where a rotation frequency of the insulating sleeve encodes data.

In this manner, data can be encoded using the waste heat of the spacecraft, such as by emitting waste heat thermal radiation in a pattern of pulses or at a frequency based on the signal generated by the modulation mechanism.

Additionally, in one embodiment of the present disclosure, the insulating sleeve is configured to slide back and forth over the cylindrical thermally radiating element thereby variably occluding the cylindrical thermally radiating element based on the signal.

In this manner, data can be encoded using the waste heat of the spacecraft, such as by emitting waste heat thermal radiation in a pattern of pulses or at a frequency based on the signal generated by the modulation mechanism.

Furthermore, in one embodiment of the present disclosure, the heat sink comprises a rotatable element that has a thermal gradient between a first side and a second side of the rotatable element.

In this manner, data can be encoded using the waste heat of the spacecraft, such as by emitting waste heat thermal radiation in a pattern of pulses or at a frequency based on the signal generated by the modulation mechanism.

Additionally, in one embodiment of the present disclosure, the rotatable element rotates at a frequency or emits a pattern of pulses in infrared based on the signal.

In this manner, data can be encoded using the waste heat of the spacecraft, such as by emitting waste heat thermal radiation in a pattern of pulses or at a frequency based on the signal generated by the modulation mechanism.

Furthermore, in one embodiment of the present disclosure, a relative temperature of the first and second sides controls amplitude modulation.

In this manner, amplitude modulation can be controlled by the relative temperature of the sides of the rotatable element of the heat sink.

Additionally, in one embodiment of the present disclosure, the spacecraft comprises a sun shield to protect the heat sink from exposure to solar radiation.

In this manner, the heat sink is protected from exposure to solar radiation thereby preventing direct sunlight to raise the temperature of the heat sink, which would hinder its ability to effectively dissipate heat Furthermore, in one embodiment of the present disclosure, a method for harnessing waste heat of a spacecraft to transmit data comprises selectively altering waste heat thermal radiation emitted from a heat sink connected to the spacecraft according to a signal, where the waste heat thermal radiation is emitted from the heat sink according to a modulation selected from the group consisting of: a frequency of pulses, a pattern of pulses, a spatial configuration of thermal signals, and a thermal gradient, and where the emission of the waste heat thermal radiation encodes the data.

In this manner, data can be transmitted in space in an energy efficient manner by harnessing the waste heat of the spacecraft to transmit data, which otherwise would be lost.

Additionally, in one embodiment of the present disclosure, the modulation includes selectively thermally connecting and disconnecting a plurality of thermally radiating elements to the heat sink according to the signal.

In this manner, data can be encoded using the waste heat of the spacecraft, such as by emitting waste heat thermal radiation in a pattern of pulses or at a frequency based on the signal generated by the modulation mechanism.

Furthermore, in one embodiment of the present disclosure, the modulation includes encoding the data at a variable frequency.

In this manner, data can be encoded using the waste heat of the spacecraft, such as by emitting waste heat thermal radiation in a pattern of pulses or at a frequency based on the signal generated by the modulation mechanism.

Additionally, in one embodiment of the present disclosure, the variable frequency controls a rate of rotation of a thermally insulating sleeve having at least one hole therein that surrounds a thermally radiating element in thermal connection with the heat sink.

In this manner, data can be encoded using the waste heat of the spacecraft, such as by emitting waste heat thermal radiation in a pattern of pulses or at a frequency based on the signal generated by the modulation mechanism.

Furthermore, in one embodiment of the present disclosure, the variable frequency controls a rate of a sliding cycle of a thermally insulating sleeve that surrounds and slides back and forth to selectively expose a thermally radiating element in thermal connection with the heat sink.

In this manner, data can be encoded using the waste heat of the spacecraft, such as by emitting waste heat thermal radiation in a pattern of pulses or at a frequency based on the signal generated by the modulation mechanism.

Additionally, in one embodiment of the present disclosure, the variable frequency controls a rate of rotation of a thermally radiating element in thermal connection with the heat sink that includes a thermal gradient between at least two faces of the thermally radiating element.

In this manner, data can be encoded using the waste heat of the spacecraft, such as by emitting waste heat thermal radiation in a pattern of pulses or at a frequency based on the signal generated by the modulation mechanism.

Furthermore, in one embodiment of the present disclosure, a system comprises an infrared optical receiver configured to detect a waste heat thermal radiation emitted from a heat sink of a spacecraft, where the waste heat thermal radiation encodes data via modulation selected from the group consisting of: a frequency of pulses, a pattern of pulses, a spatial configuration of thermal signals, and a thermal gradient, and where the infrared optical receiver is further configured to detect an infrared optical signal from the detected waste heat thermal radiation. The system further comprises a signal detection module being in electronic communication with the infrared optical receiver, where the signal detection module is configured to extract a data signal from the infrared optical signal based on the modulation.

In this manner, data can be transmitted in space in an energy efficient manner by harnessing the waste heat of the spacecraft to transmit data, which otherwise would be lost.

Additionally, in one embodiment of the present disclosure, the data signal is extracted from the infrared optical signal using a machine learning model.

In this manner, data can be extracted from the waste heat thermal radiation used to transmit the data.

As stated above, data transmission in space refers to the process of sending and receiving information between spacecrafts, satellites, and probes in space. Furthermore, such space data transmission may involve sending and receiving information between spacecrafts, satellites, or probes in space and a ground station on Earth. Such data transmissions may involve using radio waves transmitted through antennas to carry data across vast distances allowing recipients to receive information, such as images, measurements, and status updates from space missions.

Currently, in order to encode data onto radio waves, a process called modulation is used, where the wave properties are altered to represent the information. By using modulation, data is encoded in the radio waves using electromagnetic energy, which is energy intensive.

Furthermore, spacecrafts generate waste heat (excess heat generated by the spacecraft's operational components) which needs to be dissipated into space. Unfortunately, the vacuum of space is a heat insulator, which provides no material medium to carry the waste heat away from the spacecraft, such as via conduction or convection. As a result, the spacecraft's waste heat can only leave the spacecraft by radiation, usually as electromagnetic waves in the infrared band. Current solutions for removing waste heat generally involve radiative structures affixed to the spacecraft where waste heat preferentially accumulates, either by passive conduction or by active circulation of a heat transfer fluid.

Unfortunately, existing means for transmitting data in space necessarily consume the spacecraft's available power, rendering that power not available for other uses. The state of the art would be advanced by the disclosure of techniques to achieve data transmission at low power and by techniques that re-use waste heat.

The embodiments of the present disclosure provide a means for transmitting data in space in an energy efficient manner by harnessing the waste heat of the spacecraft to transmit data. In one embodiment, a heat sink is thermally connected to a spacecraft. A heat sink, as used herein, refers to a component used to dissipate heat generated by components, such as electronics of a spacecraft, allowing the heat sink to radiate heat into a vacuum of space. In one embodiment, the heat sink is made from a thermally conductive material, such as aluminum or copper, designed to absorb and disperse heat thereby preventing overheating. That is, a heat sink acts as a "sink" to draw heat away from the spacecraft and distribute it across the surrounding environment of the spacecraft, such as the vacuum of space. A spacecraft, as used herein, refers to a vehicle or machine that operates in space, and can be used for a variety of purposes, including, but not limited to, transportation (e.g., carrying astronauts, cargo, or supplies to space stations), observation (e.g., studying Earth, stars, galaxies, and other celestial bodies), communication (e.g., providing services, such as telecommunications), navigation, meteorology (e.g., providing weather forecasting services), space colonization (e.g., supporting the colonization of space), planetary exploration (e.g., exploring planets and other celestial bodies), etc. Spacecraft can be manned, carrying humans into space, or unmanned, operating autonomously or telerobotically. Furthermore, a modulation mechanism of the spacecraft, which is connected to the heat sink, selectively alters the waste heat thermal radiation emitted from the heat sink according to a signal. Waste heat thermal radiation, as used herein, refers to thermal energy released as infrared radiation from a spacecraft, such as the electronics of the spacecraft, that is not being utilized for useful work. Modulation, as used herein, refers to a process for encoding data, such as in radio waves, where the wave properties (e.g., amplitude, frequency, phrase) are altered to represent information. That is, in one embodiment, the emission of the waste heat thermal radiation from the heat sink at a particular frequency or pattern of pulses is used to encode data. The waste heat thermal radiation emitted from the heat sink is then detected, such as by an infrared optical receiver of a receiving device, which detects the heat emitted by objects in the infrared spectrum. A receiving device, as used herein, refers to a component (e.g., spacecraft, satellite, probe, ground station on Earth, etc.) that collects electromagnetic waves carrying a signal transmitted from a spacecraft. The infrared optical signal is then detected from the detected waste heat thermal radiation by the infrared optical receiver. In one embodiment, the data signal is extracted from the infrared optical signal by a signal detection module. A signal detection module, as used herein, refers to an electronic device that extracts the data signal from the infrared optical signal by converting the incoming infrared optical signal into an electrical signal that can be processed and interpreted as data. In one embodiment, the data signal is extracted from the infrared optical signal by the signal detection module using a photodetector configured to convert the incoming infrared light into an electrical signal, which is then processed and analyzed to extract the desired data information. In this manner, data can be transmitted in space in an energy efficient manner by harnessing the waste heat of the spacecraft to transmit data, which otherwise would be lost. These and other features will be discussed in further detail below.

In some embodiments of the present disclosure, the present disclosure comprises a system for harnessing the waste heat of a spacecraft situated in a space vacuum environment to transmit data. In one embodiment of the present disclosure, a heat sink is thermally connected to the spacecraft. A heat sink, as used herein, refers to a component used to dissipate heat generated by components, such as electronics of a spacecraft, allowing the heat sink to radiate heat into a space vacuum environment. A space vacuum environment can include densities of air or other matter typical of Low-Earth Orbit (LEO) as well as densities of matter typical in the interplanetary or interstellar medium. An exemplary estimate of a density of air at LEO under some conditions may be on the order of $$10^{-11}\frac{kg}{m^3},$$

which is enough material to cause drag such that spacecraft deorbit. An exemplary estimate of the density of interstellar medium may be on the order of $$10^{-11}\frac{kg}{m^3},$$

which is less density than the best human-made laboratory vacuums. A spacecraft, as used herein, refers to a vehicle or machine that operates in space, and can be used for a variety of purposes, including, but not limited to, transportation (e.g., carrying astronauts, cargo, or supplies to space stations), observation (e.g., studying Earth, stars, galaxies, and other celestial bodies), communication (e.g., providing services, such as telecommunications), navigation, meteorology (e.g., providing weather forecasting services), space colonization (e.g., supporting the colonization of space), planetary exploration (e.g., exploring planets and other celestial bodies), etc. Furthermore, the system includes a modulation mechanism of the spacecraft connected to the heat sink, where the modulation mechanism selectively alters the waste heat thermal radiation emitted from the heat sink according to a signal. Waste heat thermal radiation, as used herein, refers to thermal energy released as infrared radiation from a spacecraft, such as the electronics of the spacecraft, that is not being utilized for useful work. Modulation, as used herein, refers to a process for encoding data, such as in radio waves, where the wave properties (e.g., amplitude, frequency, phrase) are altered to represent information. In one embodiment, the emission of the waste heat thermal radiation from the heat sink at a particular frequency or pattern of pulses is used to encode data. In this manner, data can be transmitted in space in an energy efficient manner by harnessing the waste heat of the spacecraft to transmit data, which otherwise would be lost.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a spacecraft 101 thermally connected to a heat sink 102.

Spacecraft 101, as used herein, refers to a vehicle or machine that operates in space, and can be used for a variety of purposes, including, but not limited to, transportation (e.g., carrying astronauts, cargo, or supplies to space stations), observation (e.g., studying Earth, stars, galaxies, and other celestial bodies), communication (e.g., providing services, such as telecommunications), navigation, meteorology (e.g., providing weather forecasting services), space colonization (e.g., supporting the colonization of space), planetary exploration (e.g., exploring planets and other celestial bodies), etc. Spacecraft 101 can be manned, carrying humans into space, or unmanned, operating autonomously or telerobotically.

Heat sink 102, as used herein, refers to a component used to dissipate heat generated by components, such as electronics of a spacecraft, allowing the heat sink to radiate heat (waste heat thermal radiation 103) into a space vacuum environment. A space vacuum environment can include densities of air or other matter typical of Low-Earth Orbit (LEO) as well as densities of matter typical in the interplanetary or interstellar medium. An exemplary estimate of a density of air at LEO under some conditions may be on the order of $$10^{-11}\frac{kg}{m^3},$$

which is enough material to cause drag such that spacecraft deorbit. An exemplary estimate of the density of interstellar medium may be on the order of $$10^{-11}\frac{kg}{m^3},$$

which is less density than the best human-made laboratory vacuums.

In one embodiment, heat sink 102 is made from a thermally conductive material, such as aluminum or copper, designed to absorb and disperse heat thereby preventing overheating. That is, heat sink 102 acts as a "sink" to draw heat away from spacecraft 101 and distribute it across the surrounding environment of spacecraft 101, such as the vacuum of space. In one embodiment, heat sink 102 is passive by relying on its design to radiate heat (waste heat thermal radiation 103). In one embodiment, heat sink 102 is active by using mechanisms, such as louvers or pumps, to enhance heat dissipation. Examples of heat sink 102 include aluminum heat sinks, copper heat sinks, bonded fin heat sinks, and heat pipes.

In one embodiment, heat sink 102 is designed with extended surface areas, such as fins, to maximize heat dissipation (waste heat thermal radiation 103) in the vacuum of space. For example, heat sink 102 may include multiple fins in order to increase the surface area for waste heat thermal radiation 103. In one embodiment, the choice of material of heat sink 102 depends on the specific thermal requirements and weight constraints of the mission.

In one embodiment, spacecraft 101 includes a controller 104 configured to transmit data in space in an energy efficient manner by harnessing the waste heat of spacecraft 101 to transmit data. A description of the hardware configuration of controller 104 is provided further below in connection with FIG. 7.

In one embodiment, controller 104 includes a modulation mechanism 105 configured to selectively alter waste heat thermal radiation 103 emitted from heat sink 102 according to a signal whereby the emission of selectively altered waste heat thermal radiation 103 at a particular frequency or pattern of pulses is used to encode data. Waste heat thermal radiation, as used herein, refers to thermal energy released as infrared radiation from a spacecraft, such as the electronics of the spacecraft, that is not being utilized for useful work. Modulation, as used herein, refers to a process for encoding data, such as in radio waves, where the wave properties (e.g., amplitude, frequency, phrase) are altered to represent information. That is, in one embodiment, the emission of waste heat thermal radiation 103 from heat sink 102 at a particular frequency or pattern of pulses is used to encode data.

In one embodiment, modulation mechanism 105 generates such a signal by "imposing" information from a low-frequency "message" signal onto a high-frequency "carrier" wave thereby effectively changing the characteristics of the carrier wave (e.g., amplitude, frequency, or phase) to encode the information from the message signal allowing it to be transmitted over a communication channel. In one embodiment, modulation mechanism 105 performs various types of modulation, which can include, but are not limited to, amplitude modulation, frequency modulation, and phase modulation.

In one embodiment, modulation mechanism 105 generates such a signal by utilizing a variable-capacitance diode (varactor diode) by changing the capacitance of an oscillator circuit based on a modulating signal applied to it.

A discussion regarding the various embodiments for selectively altering waste heat thermal radiation 103 emitted from heat sink 102 according to a signal is provided further below in connection with FIGS. 2, 3A-3B, 4A-4B, and 5A-5C.

Furthermore, as shown in FIG. 1, spacecraft 101 includes a thermal battery 106 configured to store the waste heat of spacecraft 101. In one embodiment, heat sink 102 is connected to thermal battery 106 as shown in FIG. 1, where heat sink 102 is configured to dissipate the waste heat of spacecraft 101 stored in thermal battery 106.

In one embodiment, thermal battery 106 stores the waste heat of spacecraft 101 by melting a mass of water ice by the waste heat and refreezing the mass of water ice to discharge the waste heat.

In one embodiment, thermal battery 106 uses the latent heat of fusion of water to store energy. In such an embodiment, the water acts as the phase change material in the system as it absorbs heat when melting from ice to liquid water. Waste heat is then transferred to the water causing it to melt. The melted water is re-frozen thereby releasing the stored heat to heat sink 102.

Furthermore, as illustrated in FIG. 1, system 100 includes a receiving device 107 configured to detect waste heat thermal radiation 103 emitted from heat sink 102. Receiving device 107, as used herein, refers to a component (e.g., spacecraft, satellite, probe, ground station on Earth, etc.) that collects electromagnetic waves carrying a signal transmitted from a spacecraft.

In one embodiment, receiving device 107 includes an infrared (IR) optical receiver 108 configured to detect the heat emitted by objects in the infrared spectrum, such as waste heat thermal radiation 103 emitted from heat sink 102. In one embodiment, IR optical receiver 108 is further configured to detect an infrared optical signal from the detected waste heat thermal radiation.

In one embodiment, IR optical receiver 108 detects waste heat thermal radiation 103 emitted from heat sink 102 and detects an infrared optical signal from the detected waste heat thermal radiation by utilizing a specialized sensor that absorbs the infrared energy emitted by heat sink 102 and converting it into an electrical signal proportional to the temperature difference between heat sink 102 and its surroundings.

An example of IR optical receiver 108 that detects waste heat thermal radiation 103 emitted from heat sink 102 and detects an infrared optical signal from the detected waste heat thermal radiation is an infrared thermal imaging camera, which produces visual images based on the infrared radiation received thereby visualizing heat distributions and identifying hot spots, including the heat generated by heat sink 102.

Other examples of IR optical receiver 108 can include, but are not limited to, an infrared thermometer, and a pyroelectric infrared sensor.

In one embodiment, receiving device 107 further includes a signal detection module 109 in electronic communication with infrared optical receiver 108. In one embodiment, signal detection module 109 is configured to extract a data signal from the infrared optical signal. Signal detection module 109, as used herein, refers to an electronic device that extracts the data signal from the infrared optical signal by converting the incoming infrared optical signal into an electrical signal that can be processed and interpreted as data. In one embodiment, signal detection module 109 extracts the data signal from the infrared optical signal using a photodetector configured to convert the incoming infrared light into an electrical signal, which is then processed and analyzed to extract the desired data information.

In one embodiment, signal detection module 109 uses a machine learning model to extract the data signal from the infrared optical signal.

In one embodiment, signal detection module 109 trains the machine learning model to determine the data signal to be extracted from the infrared optical signal based on a sample data set, which includes the data signals to be extracted from the infrared optical signals. In one embodiment, such a sample data set is populated by an expert. In one embodiment, such a sample data set is stored in a storage device of controller 104.

Furthermore, in one embodiment, the sample data set discussed above is referred to herein as the "training data," which is used by a machine learning algorithm to make predictions or decisions, such as determining the data signal to be extracted from the infrared optical signal. The algorithm iteratively makes predictions on the training data until the predictions achieve the desired accuracy as determined by an expert. Examples of such learning algorithms include nearest neighbor, Naïve Bayes, decision trees, linear regression, support vector machines, and neural networks.

In this manner, data can be transmitted in space in an energy efficient manner by harnessing the waste heat of spacecraft 101 to transmit data, which otherwise would be lost.

A discussion regarding the various embodiments for selectively altering waste heat thermal radiation 103 emitted from heat sink 102 according to a signal generated by modulation mechanism 105 is provided below in connection with FIGS. 2, 3A-3B, 4A-4B, and 5A-5C.

Figure 2:
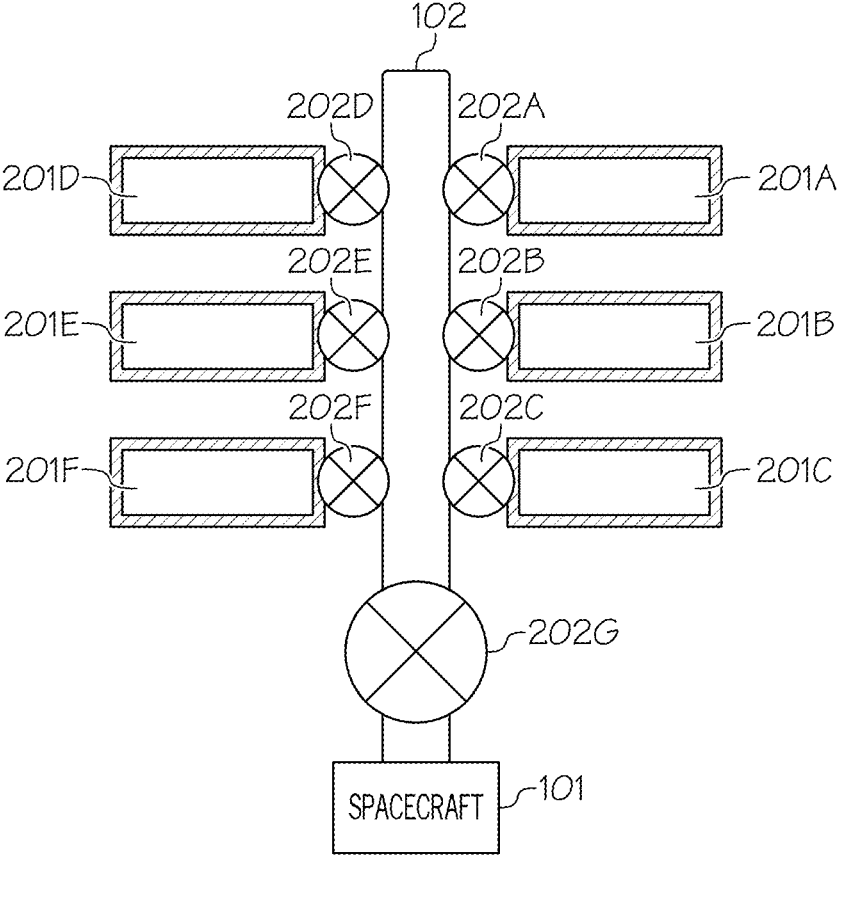
FIG. 2 illustrates selectively altering the waste heat thermal radiation emitted from the heat sink according to a signal by utilizing thermally radiating elements in accordance with an embodiment of the present disclosure.

Referring now to FIG. 2, FIG. 2 illustrates selectively altering the waste heat thermal radiation (e.g., waste heat thermal radiation 103) emitted from heat sink 102 according to a signal by utilizing thermally radiating elements in accordance with an embodiment of the present disclosure.

As shown in FIG. 2, heat sink 102 is connected to thermally radiating elements 201A-201F that are selectively thermally connected and unconnected to heat sink 102 according to a signal generated by modulation mechanism 105 via connectors 202A-202G (e.g., relays). Thermally radiating elements 201A-201F may collectively or individually be referred to as thermally radiating elements 201 or thermally radiating element 201, respectively. Connectors 202A-202G may collectively or individually be referred to as connectors 202 or connector 202, respectively.

Thermally radiating elements 201, as used herein, refer to a material or object that emits thermal radiation (waste heat thermal radiation 103) from heat sink 102. In one embodiment, thermally radiating elements 201 release heat energy (waste heat thermal radiation 103) in the form of electromagnetic waves due to its temperature. Examples of thermally radiating elements 201 can include, but are not limited to, a spacecraft radiator panel, thermal control louvers, etc.

In one embodiment, the signal generated by modulation mechanism 105 is used to initiate the connection or disconnection process being performed by connectors 202. For example, the signal generated by modulation mechanism 105 corresponds to an electrical voltage, a digital signal, or any other type of indicator that can be monitored for changes. In one embodiment, modulation mechanism 105 uses a switch as the signal source for controlling a connector 202 (e.g., relay) to connect or disconnect thermally radiating element 201 based on the switch's on/off state. In one embodiment, modulation mechanism 105 utilizes a particular switch for controlling a designated connector 202 (e.g., connector 202A) to connect or disconnect the associated thermally radiating element 201 (e.g., thermally radiating element 201A) based on the switch's on/off state. In one embodiment, modulation mechanism 105 utilizes a particular switch for controlling a designated connector 202 (e.g., connector 202G) to initiate or terminate the process of selectively altering waste heat thermal radiation 103 emitted from heat sink 102.

In one embodiment, data based on the signal is encoded in the spatial positions of thermally radiating elements 201 relative to one another. Accordingly, the thermally radiating elements may be understood as "heat pixels" that form an "image" that can be observed remotely by IR optical receiver 108 and then decoded to recover the data based on the signal. Distributing data based on the signal throughout the plurality of thermally radiating elements 201 may be understood to be a form of "modulation" as used herein.

In one embodiment, thermally radiating element 201 emits thermal radiation (waste heat thermal radiation 103) from heat sink 102 when connected to heat sink 102 via connector 202 and does not emit thermal radiation (waste heat thermal radiation 103) from heat sink 102 when disconnected to heat sink 102 via connector 202. As a result, thermal radiation (waste heat thermal radiation 103) is emitted in a pattern of pulses or at a frequency based on the signal generated by modulation mechanism 105. Such a pattern of pulses or frequency of emitted waste heat thermal radiation may correspond to data that is transmitted in space, such as to receiving device 107, which extracts the data signal from the emitted waste heat thermal radiation as previously discussed.

Referring now to FIGS. 3A-3B, FIGS. 3A-3B illustrate selectively altering the waste heat thermal radiation (e.g., waste heat thermal radiation 103) emitted from heat sink 102 according to a signal by a rotating sleeve in accordance with an embodiment of the present disclosure.

As shown in FIGS. 3A-3B, heat sink 102 corresponds to a cylindrical thermally radiating element surround by an insulating sleeve 301. Insulating sleeve 301, as used herein, refers to a tube (e.g., cylindrical tube) designed to provide electrical insulation while allowing for rotation around heat sink 102. In one embodiment, insulating sleeve 301 is made from materials, such as ceramic, fiberglass, and high-temperature resistant polymers.

In one embodiment, insulating sleeve 301 includes at least one hole 302, such as shown in FIG. 3A. In one embodiment, insulating sleeve 301 rotates and emits thermal radiation (waste heat thermal radiation 103) from heat sink 102 in a pattern of pulses via hole 302 based on the signal generated by modulation mechanism 105 as illustrated in FIGS. 3A-3B. Such a pattern of pulses may correspond to data that is transmitted in space, such as to receiving device 107, which extracts the data signal from the emitted waste heat thermal radiation as previously discussed.

In one embodiment, insulating sleeve 301 is configured to rotate at a particular frequency based on the signal generated by modulation mechanism 105, where the rotation frequency of insulating sleeve 301 encodes data. Such a frequency of emitted thermal radiation may correspond to data that is transmitted in space, such as to receiving device 107, which extracts the data signal from the emitted waste heat thermal radiation as previously discussed.

In one embodiment, insulating sleeve 301 rotates by a motor connected to insulating sleeve 301, such as via a coupling or gears, which is controlled by a signal generated by modulation mechanism 105. For example, the rotational movement of the motor is translated into a rotational movement of insulating sleeve 301. In one embodiment, the speed or frequency of the rotational movement of the motor is controlled by a signal generated by modulation mechanism 105. For example, the signal generated by modulation mechanism 105 corresponds to a volage, which is adjusted to control the speed or frequency of the rotational movement of the motor, such as via pulse width modulation, where the signal's pulse width is varied thereby effectively changing the average voltage received by the motor which controls its speed. For instance, a higher pulse width results in a higher average voltage and faster motor rotation.

Figures 4A, 4B:
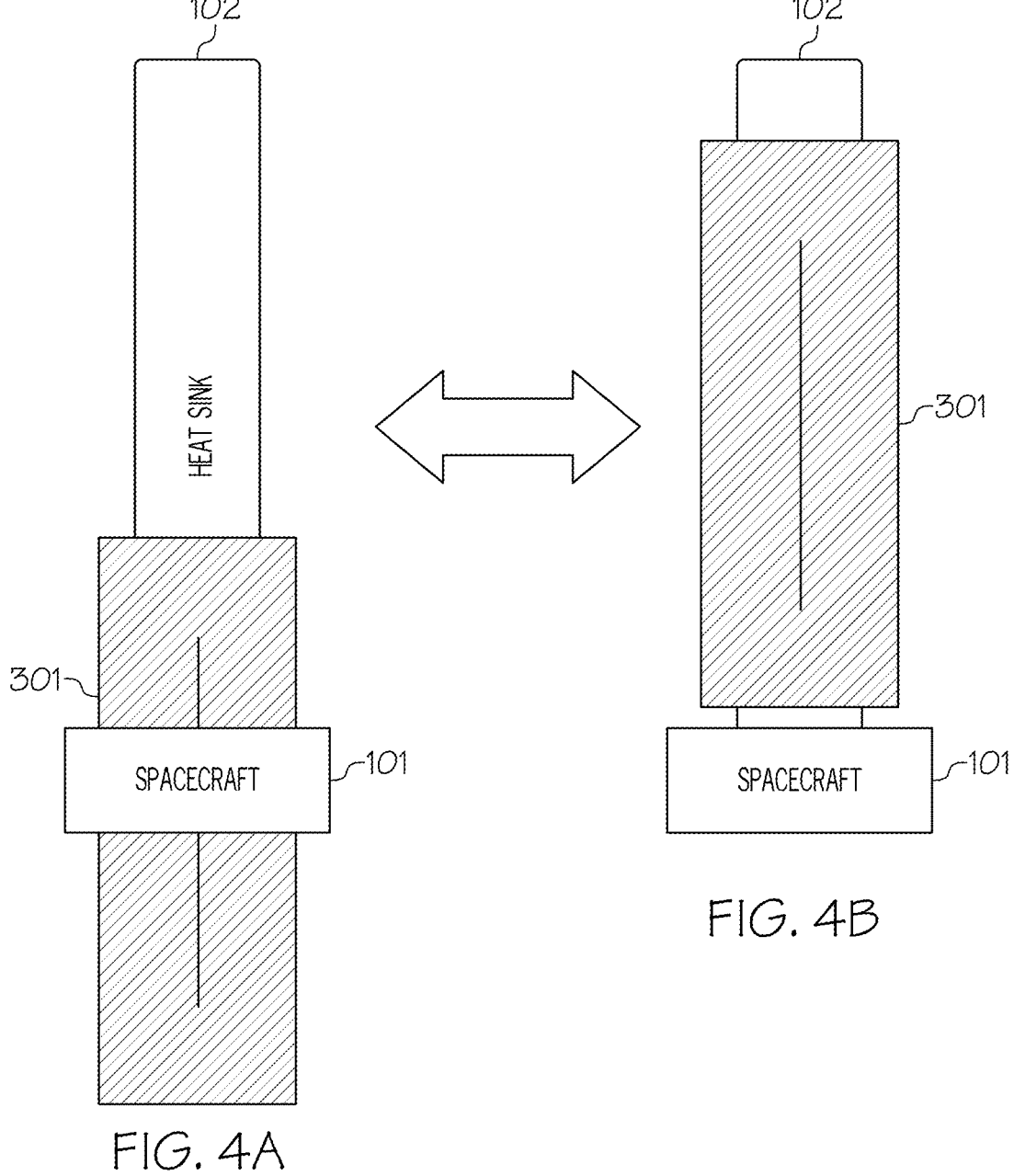
FIGS. 4A-4B illustrate selectively altering the waste heat thermal radiation emitted from the heat sink according to a signal by a sliding sleeve in accordance with an embodiment of the present disclosure.

Referring now to FIGS. 4A-4B, in conjunction with FIGS. 3A-3B, FIGS. 4A-4B illustrate selectively altering the waste heat thermal radiation (e.g., waste heat thermal radiation 103) emitted from heat sink 102 according to a signal by a sliding sleeve in accordance with an embodiment of the present disclosure.

As shown in FIGS. 4A-4B, heat sink 102 corresponds to a thermally radiating element surrounded by insulating sleeve 301 without hole 302.

In one embodiment, insulating sleeve 301 is configured to slide back and forth over the thermally radiating element of heat sink 102 thereby variably occluding the thermally radiating element of heat sink 102 based on the signal generated by modulation mechanism 105.

In one embodiment, as insulating sleeve 301 is sliding back and forth over the thermally radiating element of heat sink 102, insulating sleeve 301 covers and uncovers the thermally radiating element of heat sink 102 as shown in FIGS. 4A-4B. As insulating sleeve 301 covers and uncovers the thermally radiating element of heat sink 102, insulating sleeve 301 emits thermal radiation (waste heat thermal radiation 103) from heat sink 102 in a pattern of pulses based on the signal generated by modulation mechanism 105 as illustrated in FIGS. 4A-4B. Such a pattern of pulses may correspond to data that is transmitted in space, such as to receiving device 107, which extracts the data signal from the emitted waste heat thermal radiation as previously discussed.

In one embodiment, insulating sleeve 301 is configured to slide back and forth over the thermally radiating element of heat sink 102 at a particular frequency based on the signal generated by modulation mechanism 105, where the sliding frequency of insulating sleeve 301 encodes data. Such a frequency of emitted thermal radiation may correspond to data that is transmitted in space, such as to receiving device 107, which extracts the data signal from the emitted waste heat thermal radiation as previously discussed.

In one embodiment, insulating sleeve 301 slides back and forth over the thermally radiating element of heat sink 102 by a spring connected to insulating sleeve 301, such as via an actuator (e.g., piezoelectric actuator), which translates the signal (electrical signal, such as a voltage or current) generated by modulation mechanism 105 into mechanical force. As a result, the compression or extension of the spring is controlled based on the signal level. For example, the compression or extension of the spring is controlled based on the signal level by having the force generated by the spring being proportional to the signal level. The received signal level (e.g., level of voltage or current) generated by modulation mechanism 105 can be converted into a proportional control voltage or current by the actuator, which drives the actuator causing it to generate a force proportional to the signal level.

Referring now to FIGS. 5A-5C, FIGS. 5A-5C illustrate selectively altering the waste heat thermal radiation (e.g., waste heat thermal radiation 103) emitted from heat sink 102 according to a signal by a rotating thermal gradient in accordance with an embodiment of the present disclosure.

As shown in FIGS. 5A-5C, heat sink 102 corresponds to a rotatable element that has a thermal gradient 501 between a first side and a second side of the rotatable element. Thermal gradient 501 (also referred to as a "thermal conductivity gradient"), as used herein, refers to a spatial variation in the thermal conductivity of a material such that the ability of the material to conduct heat changes across different points within it, such as due to varying temperature or composition within the material. Examples of such a thermal conductivity gradient can include, but are not limited to, a composite material with different fillers embedded in a matrix, a layered structure, such as a sandwich panel with a high-conductivity core and low-conductivity outer layers, and a metal alloy with varying composition across its cross-section.

In one embodiment, the rotatable element of heat sink 102 rotates at a frequency or emits a pattern of pulses in the infrared based on the signal as illustrated in FIGS. 5A-5C.

In one embodiment, the amount and/or duration of waste heat thermal radiation 103 that is selected to be emitted from heat sink 102 is controlled based on thermal gradient 501 of the rotatable element of heat sink 102. In one embodiment, thermal gradient 501 is controlled via a thermoelectric Peltier device connected to the thermal gradient, which is a solid-state device that can either heat or cool by passing an electric current through it. In one embodiment, such an electric current corresponds to the signal generated by modulation mechanism 105.

In one embodiment, by controlling thermal gradient 501 of the rotatable element of heat sink 102 via a thermoelectric Peltier device, the temperature of the sides of thermal gradient 501 may change or differ, such as shown in FIGS. 5A-5C. For instance, a side of thermal gradient 501 of the rotatable element of heat sink 102 may have a cooler temperature 502 (see FIG. 5A) or a hotter temperature 503 (see FIG. 5C) or be a combination of cooler and hotter temperatures 502, 503 (see FIG. 5B). By having such different temperatures, the amount and/or duration of waste heat thermal radiation 103 that is selected to be emitted from heat sink 102, such as in a form of a pattern of pulses, is controlled based on thermal gradient 501 of the rotatable element of heat sink 102. In one embodiment, the pattern of pulses of the emitted waste heat thermal radiation may correspond to data that is transmitted in space, such as to receiving device 107, which extracts the data signal from the emitted waste heat thermal radiation as previously discussed.

In one embodiment, the frequency of the emitted thermal radiation (waste heat thermal radiation 103) by thermal gradient 501 of the rotatable element of heat sink 102 may correspond to data that is transmitted in space, such as to receiving device 107, which extracts the data signal from the emitted waste heat thermal radiation as previously discussed. In one embodiment, such a frequency (frequency modulation) is controlled by a rotation speed, which may be controlled by a motor connected to the rotatable element of heat sink 102, such as via a coupling or gears, which is controlled by a signal generated by modulation mechanism 105. For example, the rotational movement of the motor is translated into a rotational movement of the rotatable element of heat sink 102. In one embodiment, the speed or frequency of the rotational movement of the motor is controlled by a signal generated by modulation mechanism 105. For example, the signal generated by modulation mechanism 105 corresponds to a voltage, which is adjusted to control the speed or frequency of the rotational movement of the motor, such as via pulse width modulation, where the signal's pulse width is varied thereby effectively changing the average voltage received by the motor which controls its speed. For instance, a higher pulse width results in a higher average voltage and faster motor rotation.

In one embodiment, the relative temperature of the first and second sides of the rotatable element of heat sink 102 controls amplitude modulation, which encodes data in the emitted waste heat thermal radiation 103 (emitted by thermal gradient 501 of the rotatable element of heat sink 102) by varying the amplitude of a continuous carrier wave. In one embodiment, such encoded data is received by receiving device 107, which extracts the data signal from the emitted waste heat thermal radiation as previously discussed.

Figure 6:
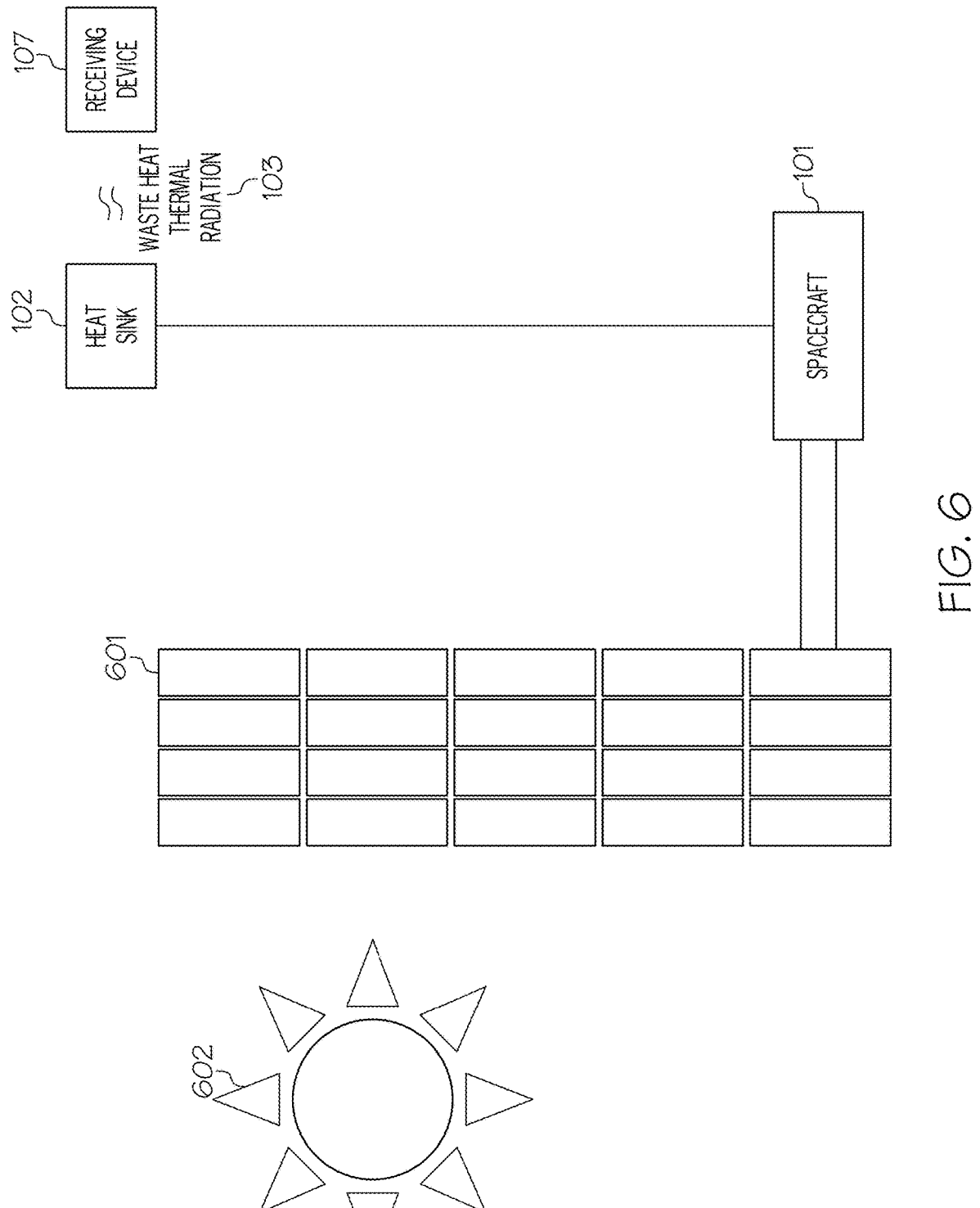
FIG. 6 illustrates using a sun shield to protect the heat sink from exposure to solar radiation in accordance with an embodiment of the present disclosure.

Returning to FIG. 1, spacecraft 101 is equipped with a sun shield to protect heat sink 102 from exposure to solar radiation thereby preventing direct sunlight to raise the temperature of heat sink 102, which would hinder its ability to effectively dissipate heat, as illustrated in FIG. 6.

FIG. 6 illustrates using a sun shield 601 to protect heat sink 102 from exposure to solar radiation in accordance with an embodiment of the present disclosure.

As shown in FIG. 6, sun shield 601 is used to protect heat sink 102 from exposure to solar radiation from sun 602. In one embodiment, sun shield 601 uses a carbon-carbon ceramic with a layer of carbon foam in between to provide such protection. In one embodiment, sun shield 601 is photovoltaic thereby generating electric current due to the exposure of light from sun 602.

As a result of the foregoing, data can be transmitted in space in an energy efficient manner by harnessing the waste heat of spacecraft 101 to transmit data, which otherwise would be lost.

A further description of these and other features is provided below in connection with the discussion of the method for harnessing waste heat from a spacecraft to transmit data.

Prior to the discussion of the method for harnessing waste heat from a spacecraft to transmit data, a description of the hardware configuration of controller 104 (FIG. 1) is provided below in connection with FIG. 7.

Figure 7:
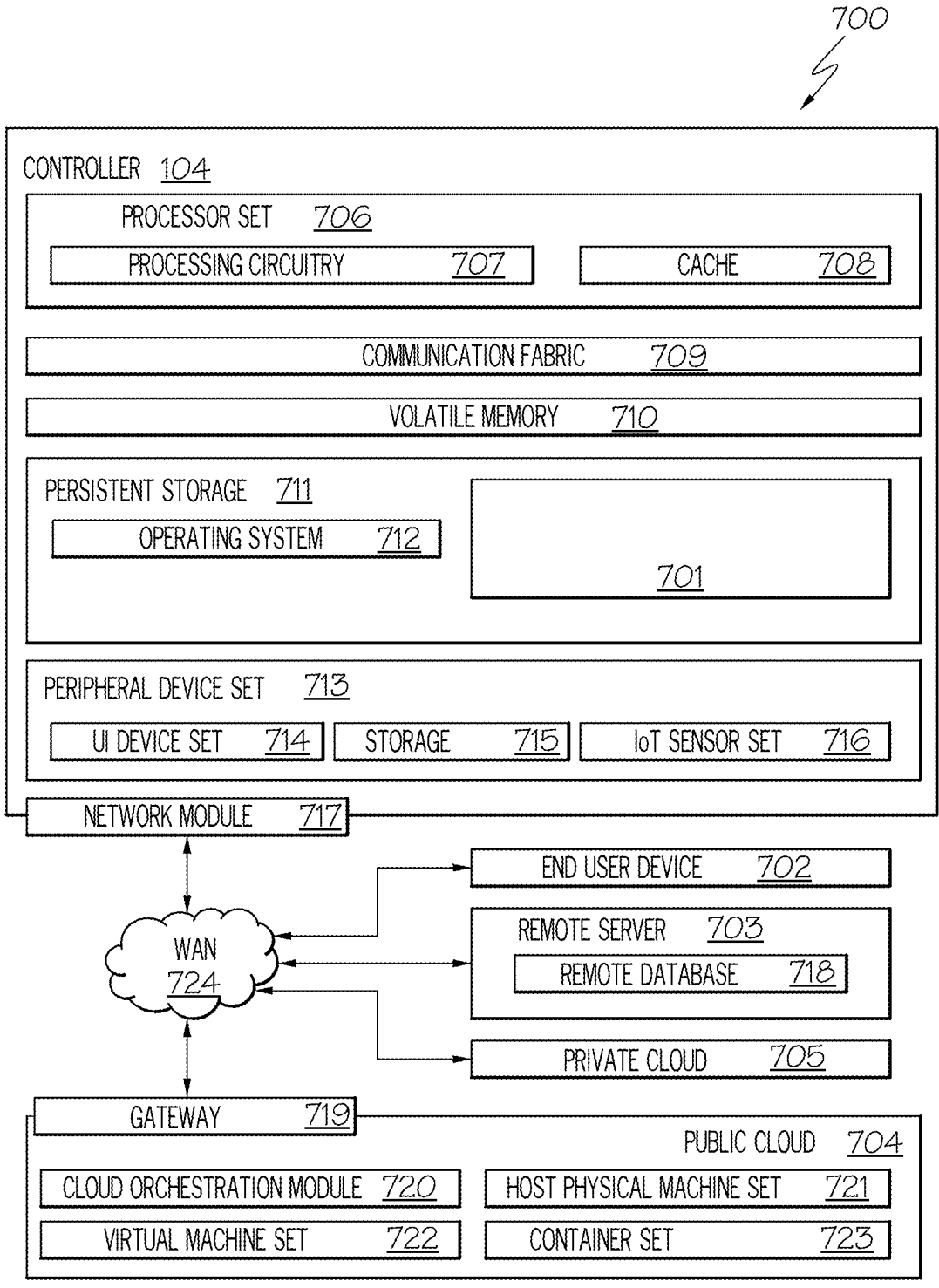
FIG. 7 illustrates an embodiment of the present disclosure of the hardware configuration of the controller which is representative of a hardware environment for practicing the present disclosure.

Referring now to FIG. 7, in conjunction with FIG. 1, FIG. 7 illustrates an embodiment of the present disclosure of the hardware configuration of controller 104 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code (stored in block 701) involved in performing the inventive methods, such as harnessing waste heat from a spacecraft to transmit data. In addition to block 701, computing environment 700 includes, for example, controller 104, network 724, such as a wide area network (WAN), end user device (EUD) 702, remote server 703, public cloud 704, and private cloud 705. In this embodiment, controller 104 includes processor set 706 (including processing circuitry 707 and cache 708), communication fabric 709, volatile memory 710, persistent storage 711 (including operating system 712 and block 701, as identified above), peripheral device set 713 (including user interface (UI) device set 714, storage 715, and Internet of Things (IoT) sensor set 716), and network module 717. Remote server 703 includes remote database 718. Public cloud 704 includes gateway 719, cloud orchestration module 720, host physical machine set 721, virtual machine set 722, and container set 723.

Controller 104 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 718. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically controller 104, to keep the presentation as simple as possible. Controller 104 may be located in a cloud, even though it is not shown in a cloud in FIG. 7. On the other hand, controller 104 is not required to be in a cloud except to any extent as may be affirmatively indicated.

Processor set 706 includes one, or more, computer processors of any type now known or to be developed in the future. Processing circuitry 707 may be distributed over multiple packages, for example, multiple, coordinated integrated circuit chips. Processing circuitry 707 may implement multiple processor threads and/or multiple processor cores. Cache 708 is memory that is located in the processor chip package(s) and is typically used for data or code that should be available for rapid access by the threads or cores running on processor set 706. Cache memories are typically organized into multiple levels depending upon relative proximity to the processing circuitry. Alternatively, some, or all, of the cache for the processor set may be located "off chip." In some computing environments, processor set 706 may be designed for working with qubits and performing quantum computing.

Computer readable program instructions are typically loaded onto controller 104 to cause a series of operational steps to be performed by processor set 706 of controller 104 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 708 and the other storage media discussed below. The program instructions, and associated data, are accessed by processor set 706 to control and direct performance of the inventive methods. In computing environment 700, at least some of the instructions for performing the inventive methods may be stored in block 701 in persistent storage 711.

Communication fabric 709 is the signal conduction paths that allow the various components of controller 104 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 710 is any type of volatile memory now known or to be developed in the future. Examples include dynamic type random access memory (RAM) or static type RAM. Typically, the volatile memory is characterized by random access, but this is not required unless affirmatively indicated. In controller 104, the volatile memory 710 is located in a single package and is internal to controller 104, but, alternatively or additionally, the volatile memory may be distributed over multiple packages and/or located externally with respect to controller 104.

Persistent Storage 711 is any form of non-volatile storage for computers that is now known or to be developed in the future. The non-volatility of this storage means that the stored data is maintained regardless of whether power is being supplied to controller 104 and/or directly to persistent storage 711. Persistent storage 711 may be a read only memory (ROM), but typically at least a portion of the persistent storage allows writing of data, deletion of data and re-writing of data. Some familiar forms of persistent storage include magnetic disks and solid state storage devices. Operating system 712 may take several forms, such as various known proprietary operating systems or open source Portable Operating System Interface type operating systems that employ a kernel. The code included in block 701 typically includes at least some of the computer code involved in performing the inventive methods.

Peripheral device set 713 includes the set of peripheral devices of controller 104. Data communication connections between the peripheral devices and the other components of controller 104 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 714 may include components such as a display screen, speaker, microphone, wearable devices (such as goggles and smart watches), keyboard, mouse, printer, touchpad, game controllers, and haptic devices. Storage 715 is external storage, such as an external hard drive, or insertable storage, such as an SD card. Storage 715 may be persistent and/or volatile. In some embodiments, storage 715 may take the form of a quantum computing storage device for storing data in the form of qubits. In embodiments where controller 104 is required to have a large amount of storage (for example, where controller 104 locally stores and manages a large database) then this storage may be provided by peripheral storage devices designed for storing very large amounts of data, such as a storage area network (SAN) that is shared by multiple, geographically distributed computers. IoT sensor set 716 is made up of sensors that can be used in Internet of Things applications. For example, one sensor may be a thermometer and another sensor may be a motion detector.

Network module 717 is the collection of computer software, hardware, and firmware that allows controller 104 to communicate with other computers through WAN 724. Network module 717 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 717 are performed on the same physical hardware device. In other embodiments (for example, embodiments that utilize software-defined networking (SDN)), the control functions and the forwarding functions of network module 717 are performed on physically separate devices, such that the control functions manage several different network hardware devices. Computer readable program instructions for performing the inventive methods can typically be downloaded to controller 104 from an external computer or external storage device through a network adapter card or network interface included in network module 717.

WAN 724 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 702 is any computer system that is used and controlled by an end user (for example, a customer of an enterprise that operates controller 104), and may take any of the forms discussed above in connection with controller 104. EUD 702 typically receives helpful and useful data from the operations of controller 104. For example, in a hypothetical case where controller 104 is designed to provide a recommendation to an end user, this recommendation would typically be communicated from network module 717 of controller 104 through WAN 724 to EUD 702. In this way, EUD 702 can display, or otherwise present, the recommendation to an end user. In some embodiments, EUD 702 may be a client device, such as thin client, heavy client, mainframe computer, desktop computer and so on.

Remote server 703 is any computer system that serves at least some data and/or functionality to controller 104. Remote server 703 may be controlled and used by the same entity that operates controller 104. Remote server 703 represents the machine(s) that collect and store helpful and useful data for use by other computers, such as controller 104. For example, in a hypothetical case where controller 104 is designed and programmed to provide a recommendation based on historical data, then this historical data may be provided to controller 104 from remote database 718 of remote server 703.

Public cloud 704 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 704 is performed by the computer hardware and/or software of cloud orchestration module 720. The computing resources provided by public cloud 704 are typically implemented by virtual computing environments that run on various computers making up the computers of host physical machine set 721, which is the universe of physical computers in and/or available to public cloud 704. The virtual computing environments (VCEs) typically take the form of virtual machines from virtual machine set 722 and/or containers from container set 723. It is understood that these VCEs may be stored as images and may be transferred among and between the various physical machine hosts, either as images or after instantiation of the VCE. Cloud orchestration module 720 manages the transfer and storage of images, deploys new instantiations of VCEs and manages active instantiations of VCE deployments. Gateway 719 is the collection of computer software, hardware, and firmware that allows public cloud 704 to communicate through WAN 724.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 705 is similar to public cloud 704, except that the computing resources are only available for use by a single enterprise. While private cloud 705 is depicted as being in communication with WAN 724, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 704 and private cloud 705 are both part of a larger hybrid cloud.

Block 701 further includes software components to harness the waste heat from a spacecraft to transmit data. In one embodiment, such components may be implemented in hardware. The functions performed by such components are not generic computer functions. As a result, controller 104 is a particular machine that is the result of implementing specific, non-generic computer functions.

In one embodiment, the functionality of such software components of controller 104, including the functionality for harnessing the waste heat from a spacecraft to transmit data, may be embodied in an application specific integrated circuit.

As stated above, data transmission in space refers to the process of sending and receiving information between spacecrafts, satellites, and probes in space. Furthermore, such space data transmission may involve sending and receiving information between spacecrafts, satellites, or probes in space and a ground station on Earth. Such data transmissions may involve using radio waves transmitted through antennas to carry data across vast distances allowing recipients to receive information, such as images, measurements, and status updates from space missions. Currently, in order to encode data onto radio waves, a process called modulation is used, where the wave properties are altered to represent the information. By using modulation, data is encoded in the radio waves using electromagnetic energy, which is energy intensive. Furthermore, spacecrafts generate waste heat (excess heat generated by the spacecraft's operational components) which needs to be dissipated into space. Unfortunately, the vacuum of space is a heat insulator, which provides no material medium to carry the waste heat away from the spacecraft, such as via conduction or convection. As a result, the spacecraft's waste heat can only leave the spacecraft by radiation, usually as electromagnetic waves in the infrared band. Current solutions for removing waste heat generally involve radiative structures affixed to the spacecraft where waste heat preferentially accumulates, either by passive conduction or by active circulation of a heat transfer fluid. Unfortunately, existing means for transmitting data in space necessarily consume the spacecraft's available power, rendering that power not available for other uses. The state of the art would be advanced by the disclosure of techniques to achieve data transmission at low power and by techniques that re-use waste heat.

Figure 8:
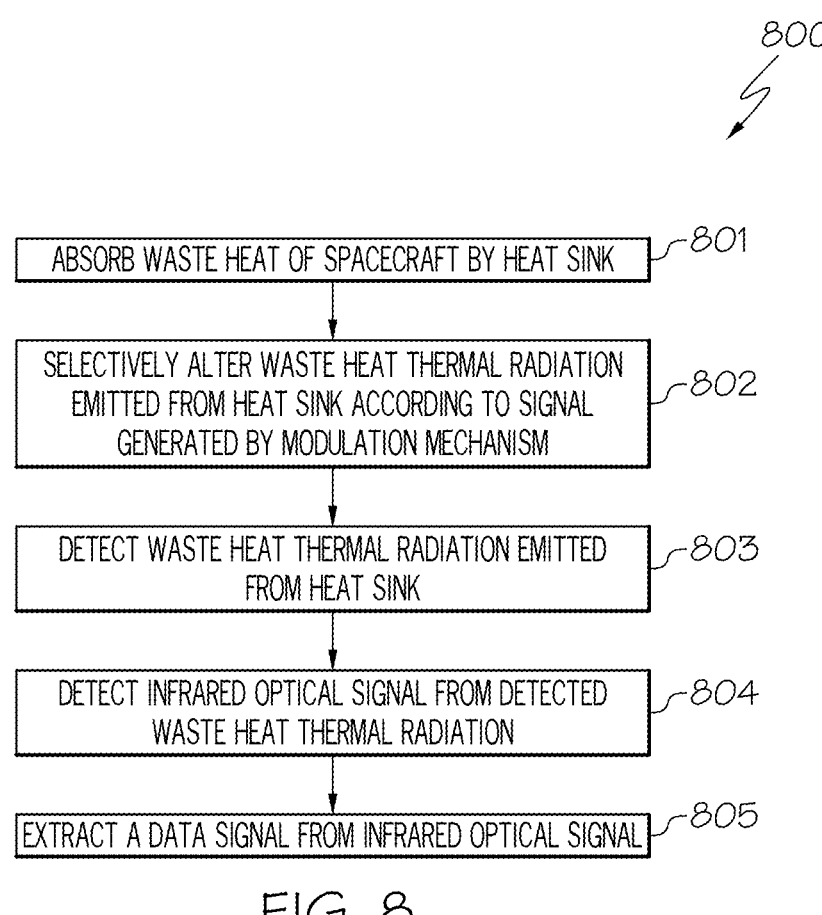
FIG. 8 is a flowchart of a method for harnessing the waste heat of a spacecraft to transmit data in accordance with an embodiment of the present disclosure.
Figure 9:
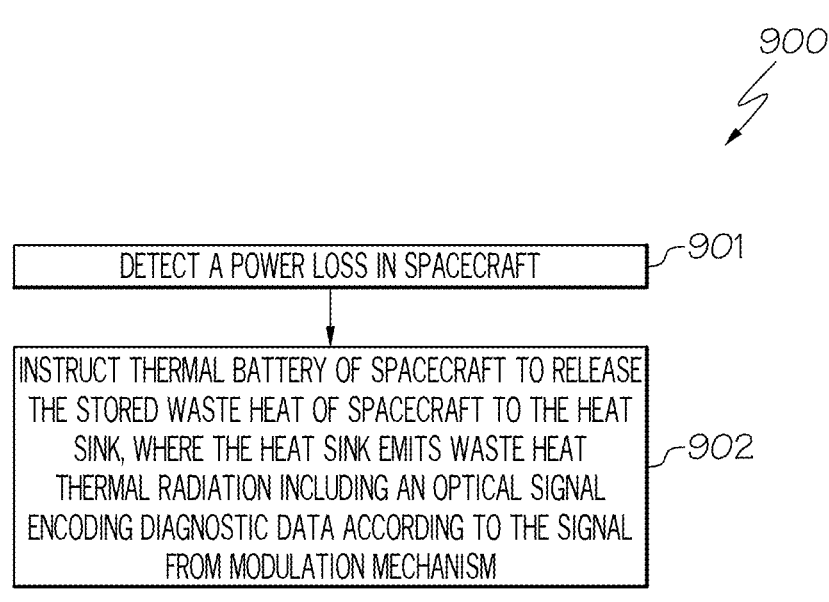
FIG. 9 is a flowchart of a method for preserving encoded data in the event of a failure state of the spacecraft in accordance with an embodiment of the present disclosure.

The embodiments of the present disclosure provide a means for transmitting data in space in an energy efficient manner by harnessing the waste heat of a spacecraft to transmit data as discussed below in connection with FIGS. 8 and 9. FIG. 8 is a flowchart of a method for harnessing the waste heat of a spacecraft (e.g., spacecraft 101) to transmit data. FIG. 9 is a flowchart of a method for preserving encoded data in the event of a failure state of the spacecraft.

As stated above, FIG. 8 is a flowchart of a method 800 for harnessing the waste heat of a spacecraft (e.g., spacecraft 101) to transmit data in accordance with an embodiment of the present disclosure.

Referring to FIG. 8, in conjunction with FIGS. 1-2, 3A-3B, 4A-4B, 5A-5C and 6-7, in operation 801, heat sink 102 absorbs the waste heat of spacecraft 101.

As discussed above, heat sink 102, as used herein, refers to a component used to dissipate heat generated by components, such as electronics of a spacecraft, allowing the heat sink to radiate heat (waste heat thermal radiation 103) into a space vacuum environment. A space vacuum environment can include densities of air or other matter typical of Low-Earth Orbit (LEO) as well as densities of matter typical in the interplanetary or interstellar medium. An exemplary estimate of a density of air at LEO under some conditions may be on the order of $$10^{-11} \frac{kg}{m^3},$$

which is enough material to cause drag such that spacecraft deorbit. An exemplary estimate of the density of interstellar medium may be on the order of $$10^{-11} \frac{kg}{m^3},$$

which is less density than the best human-made laboratory vacuums.

In one embodiment, heat sink 102 is made from a thermally conductive material, such as aluminum or copper, designed to absorb and disperse heat thereby preventing overheating. That is, heat sink 102 acts as a "sink" to draw heat away from spacecraft 101 and distribute it across the surrounding environment of spacecraft 101, such as the vacuum of space. In one embodiment, heat sink 102 is passive by relying on its design to radiate heat (waste heat thermal radiation 103). In one embodiment, heat sink 102 is active by using mechanisms, such as louvers or pumps, to enhance heat dissipation. Examples of heat sink 102 include aluminum heat sinks, copper heat sinks, bonded fin heat sinks, and heat pipes.

In one embodiment, heat sink 102 is designed with extended surface areas, such as fins, to maximize heat dissipation (waste heat thermal radiation 103) in the vacuum of space. For example, heat sink 102 may include multiple fins in order to increase the surface area for waste heat thermal radiation 103. In one embodiment, the choice of material of heat sink 102 depends on the specific thermal requirements and weight constraints of the mission.

In operation 802, controller 104 selectively alters waste heat thermal radiation 103 emitted from heat sink 102 according to a signal generated by modulation mechanism 105.

As stated above, waste heat thermal radiation 103 emitted from heat sink 102 may be selectively altered according to a signal generated by modulation mechanism 105 as discussed herein in connection with FIGS. 2, 3A-3B, 4A-4B and 5A-5C.

As shown in FIG. 2, heat sink 102 is connected to thermally radiating elements 201A-201F that are selectively thermally connected and unconnected to heat sink 102 according to a signal generated by modulation mechanism 105 via connectors 202A-202G (e.g., relays).

Thermally radiating elements 201, as used herein, refer to a material or object that emits thermal radiation (waste heat thermal radiation 103) from heat sink 102. In one embodiment, thermally radiating elements 201 release heat energy (waste heat thermal radiation 103) in the form of electromagnetic waves due to its temperature. Examples of thermally radiating elements 201 can include, but are not limited to, a spacecraft radiator panel, thermal control louvers, etc.

In one embodiment, the signal generated by modulation mechanism 105 is used to initiate the connection or disconnection process being performed by connectors 202. For example, the signal generated by modulation mechanism 105 corresponds to an electrical voltage, a digital signal, or any other type of indicator that can be monitored for changes. In one embodiment, modulation mechanism 105 uses a switch as the signal source for controlling a connector 202 (e.g., relay) to connect or disconnect thermally radiating element 201 based on the switch's on/off state. In one embodiment, modulation mechanism 105 utilizes a particular switch for controlling a designated connector 202 (e.g., connector 202A) to connect or disconnect the associated thermally radiating element 201 (e.g., thermally radiating element 201A) based on the switch's on/off state. In one embodiment, modulation mechanism 105 utilizes a particular switch for controlling a designated connector 202 (e.g., connector 202G) to initiate or terminate the process of selectively altering waste heat thermal radiation 103 emitted from heat sink 102.

In one embodiment, data based on the signal is encoded in the spatial positions of thermally radiating elements 201 relative to one another. Accordingly, the thermally radiating elements may be understood as "heat pixels" that form an "image" that can be observed remotely by IR optical receiver 108 and then decoded to recover the data based on the signal. Distributing data based on the signal throughout the plurality of thermally radiating elements 201 may be understood to be a form of "modulation" as used herein.

In one embodiment, thermally radiating element 201 emits thermal radiation (waste heat thermal radiation 103) from heat sink 102 when connected to heat sink 102 via connector 202 and does not emit thermal radiation (waste heat thermal radiation 103) from heat sink 102 when disconnected to heat sink 102 via connector 202. As a result, thermal radiation (waste heat thermal radiation 103) is emitted in a pattern of pulses or at a frequency based on the signal generated by modulation mechanism 105. Such a pattern of pulses or frequency of emitted waste heat thermal radiation may correspond to data that is transmitted in space, such as to receiving device 107, which extracts the data signal from the emitted waste heat thermal radiation as previously discussed.

As shown in FIGS. 3A-3B, heat sink 102 corresponds to a cylindrical thermally radiating element surround by an insulating sleeve 301. Insulating sleeve 301, as used herein, refers to a tube (e.g., cylindrical tube) designed to provide electrical insulation while allowing for rotation around heat sink 102. In one embodiment, insulating sleeve 301 is made from materials, such as ceramic, fiberglass, and high-temperature resistant polymers.

In one embodiment, insulating sleeve 301 includes at least one hole 302, such as shown in FIG. 3A. In one embodiment, insulating sleeve 301 rotates and emits thermal radiation (waste heat thermal radiation 103) from heat sink 102 in a pattern of pulses via hole 302 based on the signal generated by modulation mechanism 105 as illustrated in FIGS. 3A-3B. Such a pattern of pulses may correspond to data that is transmitted in space, such as to receiving device 107, which extracts the data signal from the emitted waste heat thermal radiation as previously discussed.

In one embodiment, insulating sleeve 301 is configured to rotate at a particular frequency based on the signal generated by modulation mechanism 105, where the rotation frequency of insulating sleeve 301 encodes data. Such a frequency of emitted thermal radiation may correspond to data that is transmitted in space, such as to receiving device 107, which extracts the data signal from the emitted waste heat thermal radiation as previously discussed.

In one embodiment, insulating sleeve 301 rotates by a motor connected to insulating sleeve 301, such as via a coupling or gears, which is controlled by a signal generated by modulation mechanism 105. For example, the rotational movement of the motor is translated into a rotational movement of insulating sleeve 301. In one embodiment, the speed or frequency of the rotational movement of the motor is controlled by a signal generated by modulation mechanism 105. For example, the signal generated by modulation mechanism 105 corresponds to a volage, which is adjusted to control the speed or frequency of the rotational movement of the motor, such as via pulse width modulation, where the signal's pulse width is varied thereby effectively changing the average voltage received by the motor which controls its speed. For instance, a higher pulse width results in a higher average voltage and faster motor rotation.

As shown in FIGS. 4A-4B, heat sink 102 corresponds to a thermally radiating element surrounded by insulating sleeve 301 without hole 302.

In one embodiment, insulating sleeve 301 is configured to slide back and forth over the thermally radiating element of heat sink 102 thereby variably occluding the thermally radiating element of heat sink 102 based on the signal generated by modulation mechanism 105.

In one embodiment, as insulating sleeve 301 is sliding back and forth over the thermally radiating element of heat sink 102, insulating sleeve 301 covers and uncovers the thermally radiating element of heat sink 102 as shown in FIGS. 4A-4B. As insulating sleeve 301 covers and uncovers the thermally radiating element of heat sink 102, insulating sleeve 301 emits thermal radiation (waste heat thermal radiation 103) from heat sink 102 in a pattern of pulses based on the signal generated by modulation mechanism 105 as illustrated in FIGS. 4A-4B. Such a pattern of pulses may correspond to data that is transmitted in space, such as to receiving device 107, which extracts the data signal from the emitted waste heat thermal radiation as previously discussed.

In one embodiment, insulating sleeve 301 is configured to slide back and forth over the thermally radiating element of heat sink 102 at a particular frequency based on the signal generated by modulation mechanism 105, where the sliding frequency of insulating sleeve 301 encodes data. Such a frequency of emitted thermal radiation may correspond to data that is transmitted in space, such as to receiving device 107, which extracts the data signal from the emitted waste heat thermal radiation as previously discussed.

In one embodiment, insulating sleeve 301 slides back and forth over the thermally radiating element of heat sink 102 by a spring connected to insulating sleeve 301, such as via an actuator (e.g., piezoelectric actuator), which translates the signal (electrical signal, such as a voltage or current) generated by modulation mechanism 105 into mechanical force. As a result, the compression or extension of the spring is controlled based on the signal level. For example, the compression or extension of the spring is controlled based on the signal level by having the force generated by the spring being proportional to the signal level. The received signal level (e.g., level of voltage or current) generated by modulation mechanism 105 can be converted into a proportional control voltage or current by the actuator, which drives the actuator causing it to generate a force proportional to the signal level.

As shown in FIGS. 5A-5C, heat sink 102 corresponds to a rotatable element that has a thermal gradient 501 between a first side and a second side of the rotatable element. Thermal gradient 501 (also referred to as a "thermal conductivity gradient"), as used herein, refers to a spatial variation in the thermal conductivity of a material such that the ability of the material to conduct heat changes across different points within it, such as due to varying temperature or composition within the material. Examples of such a thermal conductivity gradient can include, but are not limited to, a composite material with different fillers embedded in a matrix, a layered structure, such as a sandwich panel with a high-conductivity core and low-conductivity outer layers, and a metal alloy with varying composition across its cross-section.

In one embodiment, the rotatable element of heat sink 102 rotates at a frequency or emits a pattern of pulses in the infrared based on the signal as illustrated in FIGS. 5A-5C. In one embodiment, the amount and/or duration of waste heat thermal radiation 103 that is selected to be emitted from heat sink 102 is controlled based on thermal gradient 501 of the rotatable element of heat sink 102. In one embodiment, thermal gradient 501 is controlled via a thermoelectric Peltier device connected to the thermal gradient, which is a solid-state device that can either heat or cool by passing an electric current through it. In one embodiment, such an electric current corresponds to the signal generated by modulation mechanism 105.

In one embodiment, by controlling thermal gradient 501 of the rotatable element of heat sink 102 via a thermoelectric Peltier device, the temperature of the sides of thermal gradient 501 may change or differ, such as shown in FIGS. 5A-5C. For instance, a side of thermal gradient 501 of the rotatable element of heat sink 102 may have a cooler temperature 502 (see FIG. 5A) or a hotter temperature 503 (see FIG. 5C) or be a combination of cooler and hotter temperatures 502, 503 (see FIG. 5B). By having such different temperatures, the amount and/or duration of waste heat thermal radiation 103 that is selected to be emitted from heat sink 102, such as in a form of a pattern of pulses, is controlled based on thermal gradient 501 of the rotatable element of heat sink 102. In one embodiment, the pattern of pulses of the emitted waste heat thermal radiation may correspond to data that is transmitted in space, such as to receiving device 107, which extracts the data signal from the emitted waste heat thermal radiation as previously discussed.

In one embodiment, the frequency of the emitted thermal radiation (waste heat thermal radiation 103) by thermal gradient 501 of the rotatable element of heat sink 102 may correspond to data that is transmitted in space, such as to receiving device 107, which extracts the data signal from the emitted waste heat thermal radiation as previously discussed. In one embodiment, such a frequency (frequency modulation) is controlled by a rotation speed, which may be controlled by a motor connected to the rotatable element of heat sink 102, such as via a coupling or gears, which is controlled by a signal generated by modulation mechanism 105. For example, the rotational movement of the motor is translated into a rotational movement of the rotatable element of heat sink 102. In one embodiment, the speed or frequency of the rotational movement of the motor is controlled by a signal generated by modulation mechanism 105. For example, the signal generated by modulation mechanism 105 corresponds to a voltage, which is adjusted to control the speed or frequency of the rotational movement of the motor, such as via pulse width modulation, where the signal's pulse width is varied thereby effectively changing the average voltage received by the motor which controls its speed. For instance, a higher pulse width results in a higher average voltage and faster motor rotation.

In one embodiment, the relative temperature of the first and second sides of the rotatable element of heat sink 102 controls amplitude modulation, which encodes data in the emitted waste heat thermal radiation 103 (emitted by thermal gradient 501 of the rotatable element of heat sink 102) by varying the amplitude of a continuous carrier wave. In one embodiment, such encoded data is received by receiving device 107, which extracts the data signal from the emitted waste heat thermal radiation as previously discussed.

In operation 803, infrared (IR) optical receiver 108 of receiving device 107 detects waste heat thermal radiation 103 emitted from heat sink 102.

As discussed above, receiving device 107, as used herein, refers to a component (e.g., spacecraft, satellite, probe, ground station on Earth, etc.) that collects electromagnetic waves carrying a signal transmitted from a spacecraft.

In one embodiment, IR optical receiver 108 is configured to detect the heat emitted by objects in the infrared spectrum, such as waste heat thermal radiation 103 emitted from heat sink 102.

In operation 804, IR optical receiver 108 of receiving device 107 detects an infrared optical signal from the detected waste heat thermal radiation.

As stated above, in one embodiment, IR optical receiver 108 detects waste heat thermal radiation 103 emitted from heat sink 102 and detects an infrared optical signal from the detected waste heat thermal radiation by utilizing a specialized sensor that absorbs the infrared energy emitted by heat sink 102 and converting it into an electrical signal proportional to the temperature difference between heat sink 102 and its surroundings.

An example of IR optical receiver 108 that detects waste heat thermal radiation 103 emitted from heat sink 102 and detects an infrared optical signal from the detected waste heat thermal radiation is an infrared thermal imaging camera, which produces visual images based on the infrared radiation received thereby visualizing heat distributions and identifying hot spots, including the heat generated by heat sink 102.

Other examples of IR optical receiver 108 can include, but are not limited to, an infrared thermometer, and a pyroelectric infrared sensor.

In operation 805, signal detection module 109 of receiving device 107 extracts a data signal from the infrared optical signal.

As discussed above, signal detection module 109, as used herein, refers to an electronic device that extracts the data signal from the infrared optical signal by converting the incoming infrared optical signal into an electrical signal that can be processed and interpreted as data. In one embodiment, signal detection module 109 extracts the data signal from the infrared optical signal using a photodetector configured to convert the incoming infrared light into an electrical signal, which is then processed and analyzed to extract the desired data information.

In one embodiment, signal detection module 109 uses a machine learning model to extract the data signal from the infrared optical signal.

In one embodiment, signal detection module 109 trains the machine learning model to determine the data signal to be extracted from the infrared optical signal based on a sample data set, which includes the data signals to be extracted from the infrared optical signals. In one embodiment, such a sample data set is populated by an expert. In one embodiment, such a sample data set is stored in a storage device (e.g., storage device 711, 715) of controller 104.

Furthermore, in one embodiment, the sample data set discussed above is referred to herein as the "training data," which is used by a machine learning algorithm to make predictions or decisions, such as determining the data signal to be extracted from the infrared optical signal. The algorithm iteratively makes predictions on the training data until the predictions achieve the desired accuracy as determined by an expert. Examples of such learning algorithms include nearest neighbor, Naïve Bayes, decision trees, linear regression, support vector machines, and neural networks.

In this manner, data can be transmitted in space in an energy efficient manner by harnessing the waste heat of spacecraft 101 to transmit data, which otherwise would be lost.

At times, failures, such as due to power loss, may occur in spacecraft 101. In such events, the encoded data is preserved as discussed below in connection with FIG. 9.

FIG. 9 is a flowchart of a method 900 for preserving encoded data in the event of a failure state of the spacecraft (e.g., spacecraft 101) in accordance with an embodiment of the present disclosure.

Referring to FIG. 9, in conjunction with FIGS. 1-2, 3A-3B, 4A-4B, 5A-5C and 6-8, in operation 901, controller 104 detects a power loss in spacecraft 101.

In one embodiment, controller 104 detects a power loss in spacecraft 101 by detecting a significant drop in voltage levels on the main power bus. In one embodiment, controller 104 utilizes sensors within the electrical power system of spacecraft 101 to monitor the voltage levels on the main power bus. Such sensors trigger alerts when a significant voltage drop occurs. In one embodiment, such sensors may in combination monitor current draw and other parameters to diagnose a source of the power loss in spacecraft 101. For example, monitoring the current draw on the power bus may indicate abnormal situations, such as short circuits or excessive load on the system.

In operation 902, controller 104 instructs thermal battery 106 of spacecraft 101 to release the stored waste heat of spacecraft 101 to heat sink 102, where heat sink 102 emits waste heat thermal radiation 103, including an optical signal encoding diagnostic data according to a signal from modulation mechanism 105.

In such an embodiment, waste heat thermal radiation 103 emitted from heat sink 102 is selectively altered as discussed herein in connection with FIGS. 2, 3A-3B, 4A-4B and 5A-5C in such a manner as to encode diagnostic data in waste heat thermal radiation 103 emitted from heat sink 102. In one embodiment, such diagnostic data may correspond to stored sensor and communication data, such as in the spacecraft's power system, prior to the failure state of spacecraft 101.

In one embodiment, controller 104 instructs thermal battery 106 to release the stored waste heat to heat sink 102 by activating a control system that triggers a mechanism to circulate a coolant fluid through thermal battery 106 thereby allowing the stored heat to transfer to the circulating fluid which then carries it to heat sink 102. In one embodiment, such an activation is based on controller 104 activating a coolant pump, which may be connected to heat sink 102, to circulate the coolant fluid through thermal battery 106. In one embodiment, such an activation is in response to the detection of the power loss in spacecraft 101. In one embodiment, such a coolant pump corresponds to a centrifugal pump (e.g., Bosch® PDE) or a positive displacement pump.

Furthermore, the principles of the present disclosure improve the technology or technical field involving data transmission in space.

As discussed above, data transmission in space refers to the process of sending and receiving information between spacecrafts, satellites, and probes in space. Furthermore, such space data transmission may involve sending and receiving information between spacecrafts, satellites, or probes in space and a ground station on Earth. Such data transmissions may involve using radio waves transmitted through antennas to carry data across vast distances allowing recipients to receive information, such as images, measurements, and status updates from space missions. Currently, in order to encode data onto radio waves, a process called modulation is used, where the wave properties are altered to represent the information. By using modulation, data is encoded in the radio waves using electromagnetic energy, which is energy intensive. Furthermore, spacecrafts generate waste heat (excess heat generated by the spacecraft's operational components) which needs to be dissipated into space. Unfortunately, the vacuum of space is a heat insulator, which provides no material medium to carry the waste heat away from the spacecraft, such as via conduction or convection. As a result, the spacecraft's waste heat can only leave the spacecraft by radiation, usually as electromagnetic waves in the infrared band. Current solutions for removing waste heat generally involve radiative structures affixed to the spacecraft where waste heat preferentially accumulates, either by passive conduction or by active circulation of a heat transfer fluid. Unfortunately, existing means for transmitting data in space necessarily consume the spacecraft's available power, rendering that power not available for other uses. The state of the art would be advanced by the disclosure of techniques to achieve data transmission at low power and by techniques that re-use waste heat.

Embodiments of the present disclosure improve such technology by having a heat sink be thermally connected to the spacecraft. A heat sink, as used herein, refers to a component used to dissipate heat generated by components, such as electronics of a spacecraft, allowing the heat sink to radiate heat into a space vacuum environment. A space vacuum environment can include densities of air or other matter typical of Low-Earth Orbit (LEO) as well as densities of matter typical in the interplanetary or interstellar medium. An exemplary estimate of a density of air at LEO under some conditions may be on the order of $$10^{-11}\frac{kg}{m^3},$$

which is enough material to cause drag such that spacecraft deorbit. An exemplary estimate of the density of interstellar medium may be on the order of $$10^{-11}\frac{kg}{m^3},$$

which is less density than the best human-made laboratory vacuums. A spacecraft, as used herein, refers to a vehicle or machine that operates in space, and can be used for a variety of purposes, including, but not limited to, transportation (e.g., carrying astronauts, cargo, or supplies to space stations), observation (e.g., studying Earth, stars, galaxies, and other celestial bodies), communication (e.g., providing services, such as telecommunications), navigation, meteorology (e.g., providing weather forecasting services), space colonization (e.g., supporting the colonization of space), planetary exploration (e.g., exploring planets and other celestial bodies), etc. Furthermore, the system includes a modulation mechanism of the spacecraft connected to the heat sink, where the modulation mechanism selectively alters the waste heat thermal radiation emitted from the heat sink according to a signal. Waste heat thermal radiation, as used herein, refers to thermal energy released as infrared radiation from a spacecraft, such as the electronics of the spacecraft, that is not being utilized for useful work. Modulation, as used herein, refers to a process for encoding data, such as in radio waves, where the wave properties (e.g., amplitude, frequency, phrase) are altered to represent information. In one embodiment, the emission of the waste heat thermal radiation from the heat sink at a particular frequency or pattern of pulses is used to encode data. In this manner, data can be transmitted in space in an energy efficient manner by harnessing the waste heat of the spacecraft to transmit data, which otherwise would be lost. Furthermore, in this manner, there is an improvement in the technical field involving data transmission in space.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for harnessing waste heat of a spacecraft situated in a space vacuum environment to transmit data, the system comprising:

a heat sink thermally connected to the spacecraft, wherein the heat sink is configured to absorb and dissipate waste heat of the spacecraft into the space vacuum environment; and a modulation mechanism of the spacecraft connected to the heat sink, wherein the modulation mechanism is configured to selectively alter a waste heat thermal radiation emitted from the heat sink according to a signal, wherein data based on the signal is detectable in the waste heat thermal radiation.

2. The system as recited in claim 1, wherein the heat sink is connected to a plurality of thermally radiating elements that are selectively thermally connected and unconnected to the heat sink according to the signal.

3. The system as recited in claim 2, wherein the thermally radiating elements are spatially distributed such that the selective thermal connection and disconnection encodes the data in a spatial relationship between the thermally radiating elements.

4. The system as recited in claim 1, wherein the heat sink comprises a cylindrical thermally radiating element surrounded by an insulating sleeve.

5. The system as recited in claim 4, wherein the insulating sleeve comprises at least one hole.

6. The system as recited in claim 5, wherein the insulating sleeve is configured to rotate thereby emitting thermal radiation in a pattern of pulses via the at least one hole based on the signal.

7. The system as recited in claim 6, wherein the insulating sleeve is configured to rotate at a particular frequency based on the signal, wherein a rotation frequency of the insulating sleeve encodes data.

8. The system as recited in claim 4, wherein the insulating sleeve is configured to slide back and forth over the cylindrical thermally radiating element thereby variably occluding the cylindrical thermally radiating element based on the signal.

9. The system as recited in claim 1, wherein the heat sink comprises a rotatable element that has a thermal gradient between a first side and a second side of the rotatable element.

10. The system as recited in claim 9, wherein the rotatable element rotates at a frequency or emits a pattern of pulses in infrared based on the signal.

11. The system as recited in claim 9, wherein a relative temperature of the first and second sides controls amplitude modulation.

12. The system as recited in claim 1, wherein the spacecraft comprises a sun shield to protect the heat sink from exposure to solar radiation.

13. A method for harnessing waste heat of a spacecraft to transmit data, the method comprising:

selectively altering waste heat thermal radiation emitted from a heat sink connected to the spacecraft according to a signal, wherein the waste heat thermal radiation is emitted from the heat sink according to a modulation selected from the group consisting of: a frequency of pulses, a pattern of pulses, a spatial configuration of thermal signals, and a thermal gradient, wherein the emission of the waste heat thermal radiation encodes the data.

14. The method as recited in claim 13, wherein the modulation includes selectively thermally connecting and disconnecting a plurality of thermally radiating elements to the heat sink according to the signal.

15. The method as recited in claim 13, wherein the modulation includes encoding the data at a variable frequency.

16. The method as recited in claim 15, wherein the variable frequency controls a rate of rotation of a thermally insulating sleeve having at least one hole therein that surrounds a thermally radiating element in thermal connection with the heat sink.

17. The method as recited in claim 15, wherein the variable frequency controls a rate of a sliding cycle of a thermally insulating sleeve that surrounds and slides back and forth to selectively expose a thermally radiating element in thermal connection with the heat sink.

18. The method as recited in claim 15, wherein the variable frequency controls a rate of rotation of a thermally radiating element in thermal connection with the heat sink that includes a thermal gradient between at least two faces of the thermally radiating element.

19. A system, comprising:

an infrared optical receiver configured to detect a waste heat thermal radiation emitted from a heat sink of a spacecraft, wherein the waste heat thermal radiation encodes data via modulation selected from the group consisting of: a frequency of pulses, a pattern of pulses, a spatial configuration of thermal signals, and a thermal gradient, wherein the infrared optical receiver is further configured to detect an infrared optical signal from the detected waste heat thermal radiation; and a signal detection module being in electronic communication with the infrared optical receiver, wherein the signal detection module is configured to extract a data signal from the infrared optical signal based on the modulation.

20. The system as recited in claim 19, wherein the data signal is extracted from the infrared optical signal using a machine learning model.

* * * * *